United States Patent [19]
Yeager et al.

[11] Patent Number: 5,745,689
[45] Date of Patent: Apr. 28, 1998

[54] SYSTEM AND METHOD FOR PROVIDING PAGER SERVICES TO USERS OF A COMPUTER NETWORK

[75] Inventors: Jeffrey Yeager, Spring Hill; Alan F. Rosenhauer; Joel R. Jensen, both of Franklin, all of Tenn.

[73] Assignee: Electronic Data Systems Corporation, Plano, Tex.

[21] Appl. No.: 652,066

[22] Filed: May 23, 1996

[51] Int. Cl.⁶ .......................... G06F 13/00; H04M 11/00
[52] U.S. Cl. .............. 395/200.36; 395/200.37; 340/825.44
[58] Field of Search ................ 395/527, 200.48, 395/200.55, 200.43, 182.04, 182.05, 185.1, 200.34, 200.35, 200.36, 200.37; 379/56, 58, 67; 370/338, 401; 455/31.2; 340/825.44

[56] References Cited

U.S. PATENT DOCUMENTS

| | | | |
|---|---|---|---|
| 5,487,100 | 1/1996 | Kane | 455/31.2 |
| 5,543,785 | 8/1996 | Vatt et al. | 340/825.44 |
| 5,548,814 | 8/1996 | Lorang et al. | 455/38.1 |
| 5,557,659 | 9/1996 | Hyde-Thomson | 379/88 |
| 5,561,703 | 10/1996 | Arledge et al. | 455/31.2 |
| 5,604,788 | 2/1997 | Tett | 455/412 |

OTHER PUBLICATIONS

Document from The Hyde Company, Inc. regarding "Spatch Features" dated Jan. 31, 1996 (3 pages).

*Primary Examiner*—Parshotam S. Lall
*Assistant Examiner*—Viet Vu
*Attorney, Agent, or Firm*—L. Joy Griebenow

[57] ABSTRACT

A method for providing pager services to users of a computer network (10) is presented. The method includes the step of sending pager address data and pager message data from a client node (14) on a computer network (10) to a primary pager server (40) on the computer network (10). The primary pager server (40) converts the pager address data into operating instructions for an external communications medium interface device, and communicates with a pager system via the external communications medium interface device. The primary pager server (40) then sends the pager message data to the pager system using the external communications medium interface device.

22 Claims, 3 Drawing Sheets

SYSTEM AND METHOD FOR PROVIDING PAGER SERVICES TO USERS OF A COMPUTER NETWORK

TECHNICAL FIELD OF THE INVENTION

This invention relates in general to the field of computer networks, and more particularly, to a system and method for providing paper services to users of a computer network.

BACKGROUND OF THE INVENTION

Telecommunications paging systems have been widely implemented. A typical telecommunications paging system includes a radio frequency transmitter that emits radio-frequency electromagnetic radiation. The paging system encodes data in this radio frequency electromagnetic radiation, and transmits the data to users of the paging system within the service area of the radio frequency transmitter. Users of the paging system carry portable radio frequency receivers, which decode the data encoded in the radio frequency transmission.

In operation, a message directs a caller to a user of the telephone paging system if the user does not answer the call. Alternately, a caller may call the paging system directly if desired, or the phone system may automatically forward the caller to the paging system. After the caller reaches the paging system the caller may enter data, such as a telephone number or a text message. The paging system encodes this data and transmits the data to the user of the system.

Although telecommunications paging systems may be designed to transmit text messages, existing systems are designed for use with individual personal computers or other individual data entry devices. Such systems require a software system to be installed on the personal computer or data entry device, and also require a telecommunications modem ("modem") that allows the personal computer or data entry device to connect to the telecommunications network. Pages may be sent from a caller to a user of the paging system only if the caller has a personal computer or data entry device with both the operating system software and a modem.

Furthermore, when these systems are applied to a computer network, they typically require that each user of the network have both a modem and the operational software for operating the modem installed on that user's personal computer. Thus, such systems are not network services, but are systems that are compatible with a network. Although host-based systems with dumb terminals may be used to provide text pager services, such host-based systems do not provide fault protection, do not allow distributed data processing which increases the service load on the host, require all clients to log on to a specific host, and may require the size of the host to be increased if the number of users increases.

SUMMARY OF THE INVENTION

Therefore a need has arisen for a computer network that provides pager services. In particular, a computer network is required that allows users of the network to access paging services in the same manner that users of the network access other network services.

One aspect of the present invention is a method for providing pager services to users of a computer network that includes sending pager address data and pager message data from a client node on a network to a pager server on the network. The pager server converts the pager address data into dialing instructions for a modem, and dials a pager system with the modem. The pager server then sends the pager message data to the pager system using the modem.

Another aspect of the present invention is a method for providing pager services to users of a computer network that includes sending a request for a file of pager addresses from a client node to a pager server. The pager server sends the file of pager addresses to the client node. The caller at the client node selects addresses from the file of pager addresses, which are referred to as pager address data. The caller also enters pager message data, and the client node sends the pager address data and the pager message data to the pager server. The pager server gets the telephone number from a data file for each address in the pager address data file. The pager server also gets the pager user number and pager system data transfer parameters needed for each individual address in the pager address data file. The pager server sets the modem data transfer parameters to match the pager system data transfer parameters, dials the pager system with the modem, and sends the pager message data to the pager system.

A further aspect of the present invention is a computer network with pager services that includes a modem, a communications system, and a client node connected to the communications system. The client node can transmit pager address data and pager message data to the communications system. The computer network also includes a pager server that couples to the communications system and the modem. The pager server receives the pager address data and pager message data from the communications system, and determines a pager system telephone number and user number from the control data. The pager server then dials the modem using the pager system telephone number, enters the user number, and sends the message data.

The present invention provides several important technical advantages. One important technical advantage of the present invention is that it provides text paging capability by all users of the network without requiring each user to have an external communications medium interface device such as a modem. The computer network paging system of the present invention uses a network modem bank for connection to the telecommunications network.

Another important technical advantage of the present invention is that it provides pager services in a computer network that are compatible with other services provided by the computer network. Thus, the computer network paging system of the present invention can be coordinated with other network services to minimize administrative requirements of the paging system.

Yet another important technical advantage of the present invention is that it allows computer network pager services to include fault tolerance. If the primary network pager server experiences a fault, back-up network pager servers can automatically continue to provide pager services to users of the computer network.

Another important technical advantage of the present invention is that it provides the capability for transmitting diagnostic and error messages to system administrators of the computer network. Operating commands may be coded into network operating software that include sending a text message description of a diagnostic or error message to a designated system administrator over the paging system.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein.

DETAILED DESCRIPTION OF THE INVENTION

General System Architecture

Figure 1:
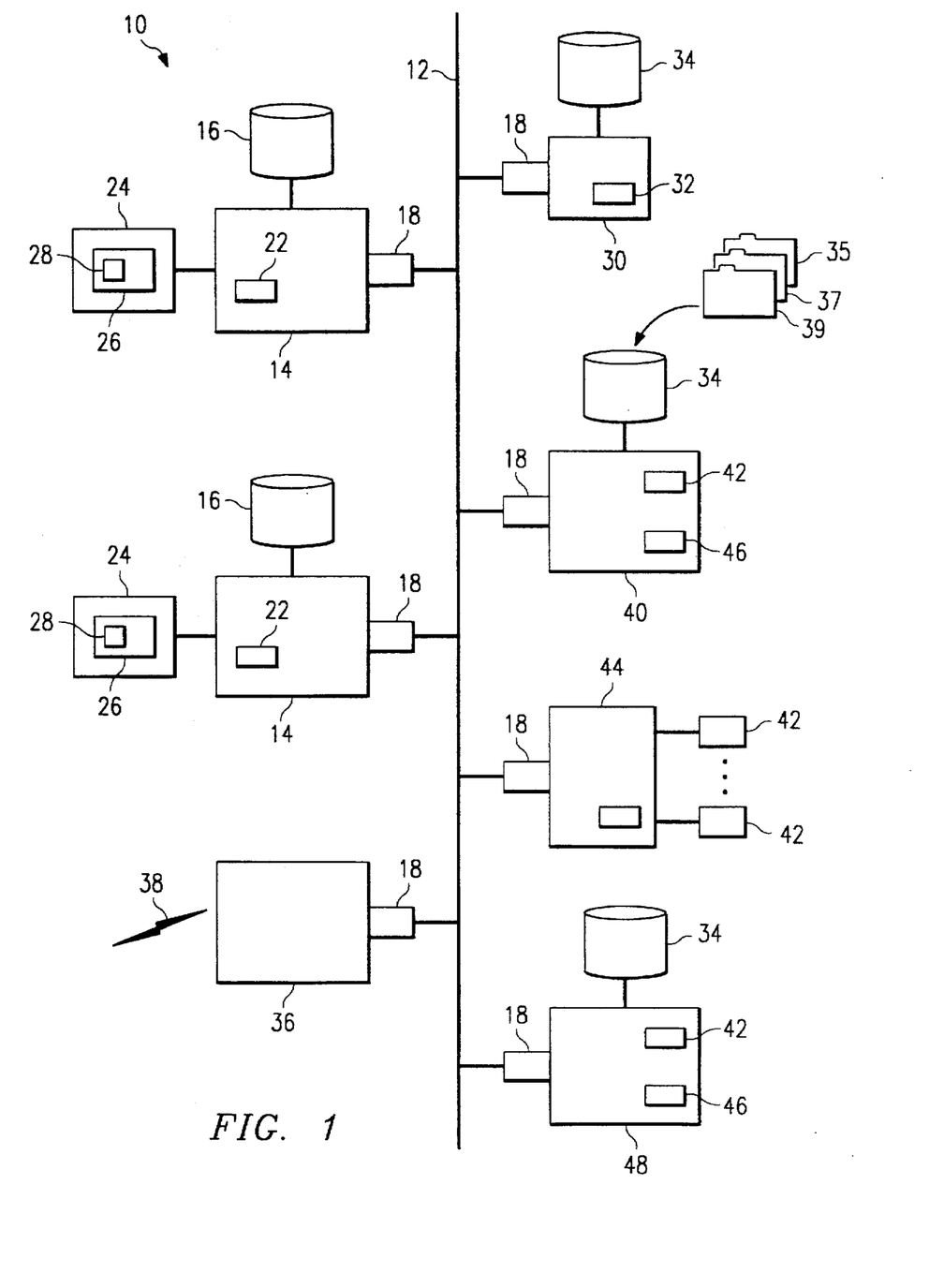
FIG. 1 is a schematic diagram of a computer network embodying concepts of the present invention.

FIG. 1 is a schematic diagram of computer network 10 constructed according to the teachings of the present invention. Computer network 10 includes communications medium 12. Communications medium 12 may be a twisted, shielded conductor pair, a coaxial cable, a fiber optic cable, or other conducting mediums having sufficient data transfer bandwidth. Computer network 10 also includes client nodes 14, each having data storage 16, network interface device 18, processor 22, and display 24. Client node 14 may include a personal computer, a workstation, or other devices that have the ability to interface with network access software operating on network interface device 18. Display 24 is operable to generate graphical user interface ("GUI") 26 having one or more icons 28.

Also present in computer network 10 are servers 30, each having network interface device 18 that couples to communications medium 12. Server 30 may be a personal computer, a workstation, or other computational facilities that have the ability to interface with network operating software operating on network interface device 18. Servers 30 typically contain processor 32 and data storage 34. Data storage 34 may be a random access memory, a disk drive, a tape drive, or other type of data storage device, and may contain message data file 35, pager status file 37, pager system data file 39, and other data files. Server operating software operates on processor 32, and controls some operations of server 30.

The server operating software also interfaces with server access software operating on processor 22 of client node 14, by communicating through network interface devices 18 and communications medium 12.

Also present in computer network 10 is gateway 36. Gateway 36 couples to communications medium 12 through network interface device 18. Gateway 36 couples to external communications medium 38. External communications medium 38 may include the public switched telephone network (PSTN), an integrated services digital network (ISDN), a frame relay that operates in asynchronous transfer mode (ATM), or other communications mediums operable to transfer data from gateway 36 to a gateway of another computer network (not explicitly shown) also coupled to external communications medium 38. Gateway 36 is operable to retrieve data from communications medium 12 and transmit the data from computer network 10 to these other computer networks coupled to external communications medium 38.

Server 30 may be one or more servers that provide information services to users of computer network 10. For example, server 30 may provide printing services to users at client nodes 14 of computer network 10. Printer server operations software operating on processor 32 may monitor data communicated over communications medium 12 through network interface device 18 and may retrieve data with an appropriate address or content that indicates the data is for printing. The printer server operations software may then perform such functions as queuing data files transmitted for printing or redirecting data files transmitted for printing to a back-up printer in the event that the designated printer has failed.

Likewise, server 30 may provide mail services to users at client nodes 14 of computer network 10. Mail server operations software operating on processor 32 may monitor data communicated over communications medium 12 through network interface device 18 and may retrieve data with an appropriate address or content that indicates the data is for mail services. Mail services may include notifying the user of the network of any mail that has been sent to the user while the user was not logged on to computer network 10, keeping a log of all users that are logged on to computer network 10, and determining whether mail messages must be transmitted to gateway 36 and the appropriate remote address. One skilled in the art will recognize that mail server operating software operating on server 30 may include many other functions.

Computer network 10 of the present invention also includes primary pager server 40. Primary pager server 40 may be a stand-alone server as shown, or may be included in server 30. Primary pager server 40 may include one or more external communications medium interface devices 42, such as a modem, or may be operable to access network communications server 44, which may include one or more external communications medium interface devices 42. Furthermore, primary pager server 40 and network communications server 44 may also access the PSTN, an ISDN, an ATM frame relay, or any other communications medium that can couple to an external paging system.

Computer network 10 of the present invention also includes one or more back-up pager servers 48, which may be a stand-alone device as shown or included in primary pager server 40 or servers 30. Each back-up pager server includes network interface device 18, processor 46, and data storage 34, and may also include one or more external communications medium interface devices 42. Each back-up pager operates pager server operating software on processor 46, and has a priority assigned by the system administrator. Alternately, each back-up pager server 48 may be operable to poll other back-up pager servers 48 and primary pager server 40, and to assign itself a priority relative to the priority of other back-up pager servers. For example, if all other back-up pager servers have not assigned themselves a priority, a back-up pager server may request a token ring or similar device, assign itself a priority of "1" after receiving the token ring, and then pass the token ring to the next pager server.

Pager server operating software operating on processor 46 of primary pager server 40 monitors the data transmitted over communications medium 12 of computer network 10 and recognizes pager messages entered by users of the network at client nodes 14, such as by content or address. Likewise, pager server access software operating on processors 22 of client nodes 14 allows pager messages to be transmitted through network interface devices 18 over communications medium 12 to primary pager server 40.

System Operation

In operation, a caller at client node 14 actuates the pager server access software, such as by selecting icon 28 in GUI 26. The pager server access software operating on processor 22 of client node 14 interfaces with pager server operating software operating on processor 46 of primary pager server 40, prompts the caller for addresses and a message, and transmits the message and address data to primary pager server 40 when the caller has completed data entry of the message. Pager server operating software on primary pager server 40 monitors data transmitted over communications medium 12 through network interface device 18, retrieves any pager messages transmitted from a caller through client node 14, and transmits the messages to the user of a paging system. The method of operation of this system is described in greater detail in FIG. 2.

Figure 2:
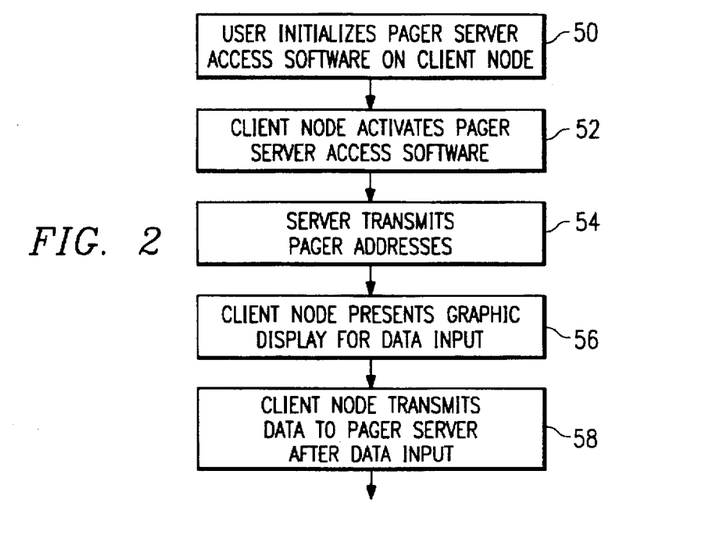
FIG. 2 is a flow chart that demonstrates the interaction between network operating software operating on the pager server and network access software operating on the client node.

FIG. 2 is a flow chart that demonstrates the interaction between pager server operating software operating on primary pager server 40 and pager server access software operating on client node 14. At step 50, the pager server access software operating on processor 22 of client node 14 is initialized, which may occur when processor 22 of client node 14 is powered up. Client node 14 may request address data from pager server 40 at this time.

At step 52, a caller at client node 14 initiates a call to a user of a paging system by activating the pager server access software resident on client node 14, such as by selecting an icon in a windows-based operating system. Client node 14 may request address data from pager server 40 at this time, or may retrieve pager address data from data storage 16. Pager server operating software operating on primary pager server 40 transmits the address data to client node 14 at step 54, if requested.

At step 56, client node 14 generates GUI 26 for data input using the pager server access software operating on client node 14. GUI 26 is described in greater detail in FIG. 3, and allows the user at client node 14 to enter pager address data, such as a list of addresses, and pager message data. At step 58, the caller at client node 14 transmits the pager address data and pager message data to primary pager server 40 after the caller indicates that data input is complete, such as by selecting an "OK" button, an object, or an icon. One skilled in the art will recognize that these steps may be varied in the order in which they are taken without departing from the spirit or scope of the present invention. For example, the caller may transmit the pager message data to primary pager server 40 prior to sending the pager address data.

Figure 3:
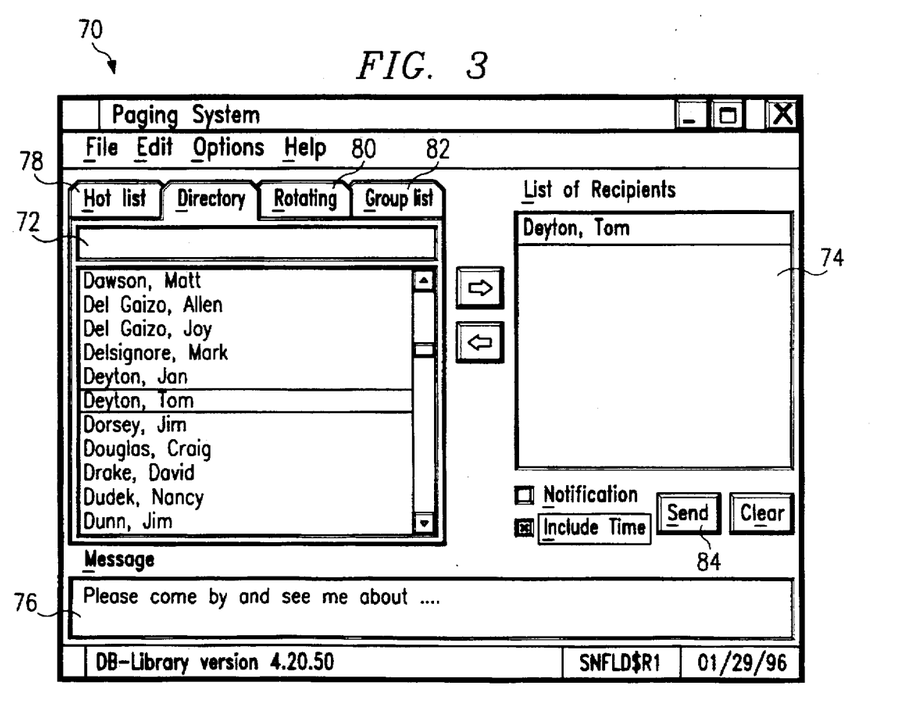
FIG. 3 is an example of a graphical data display that may be used for data input from a caller at a client node to a pager server of the present invention.

FIG. 3 is an example of graphical data display 70 that may be used for data input from a caller at client node 14 to primary pager server 40 of the present invention. Graphical data display 70 is similar to GUI 26 of FIG. 1. Graphical data display 70 includes user-selectable directory 72, address list 74, and message data block 76. One skilled in the art will recognize that pager address data may be entered in a separate window prior to entry of pager message data, and that the arrangement of data fields on the screen may be altered without departing from the scope or spirit of the present invention. Directory 72 includes hot list 78, rotating group 80, and group list 82. Hot list 78 is a list of frequently used pager addresses, which allows users to avoid sorting through every directory entry. Hot list 78 may also be designed to include certain pager addresses even if they are infrequently used, such as personal pager numbers.

Rotating group 80 is a listing of functional personnel titles that may be assigned by the pager server administrator, according to, for example, a previously-entered schedule, or by other methods that result in a rotating group of pager addresses. These titles correspond to functions as opposed to individual persons. For example, one entry on rotating group 80 may be "mail server administrator." Although many personnel may be mail server administrators, only the address for the mail server administrator on call will be selected when the caller selects the pager server administrator on rotating group 80 as an addressee.

Directory 72 also includes group list 82, which is a listing of organizational groups. For example, group list 82 may include groups such as emergency medical, fire hazard, engineering, etc. Graphical data display 70 further includes address list 74, which displays the addresses selected by the caller from directory 72. Message data block 76 of graphical data display 70 contains an area for caller entry of the text message to be transmitted to the addresses in address list 74. One skilled in the art will recognize that many other graphical data displays may be utilized for data entry.

In operation, a caller at client node 14 activates the pager server accessing software operating on processor 22 of client node 14, such as by selecting an icon in a windows operating system. The pager server accessing software operating on client node 14 and the pager server operating software operating on primary pager server 40 then jointly execute steps 50 through 58 of FIG. 2. These steps transpire transparently to the caller. Client node 14 presents the caller with data input screen 70, and accepts the data entered by the caller after the caller activates send button 84. Following caller activation of send button 84, the message and addresses are transmitted by pager server accessing software operating on processor 22 of client node 14 through the network access software operating on network interface device 18 over communications medium 12 of computer network 10.

The message and addresses are received by the network operating software operating on network interface device 18 of primary pager server 40, and are transmitted to the pager server operating software operating on processor 46 of primary pager server 40. Primary pager server 40 then transmits the message over external communications medium interface device 42 or over network communications server 44 to the paging system for broadcast to the user of the paging system. One skilled in the art will recognize that data entry may also be accomplished with a non-windows-based operating system.

Figure 4:
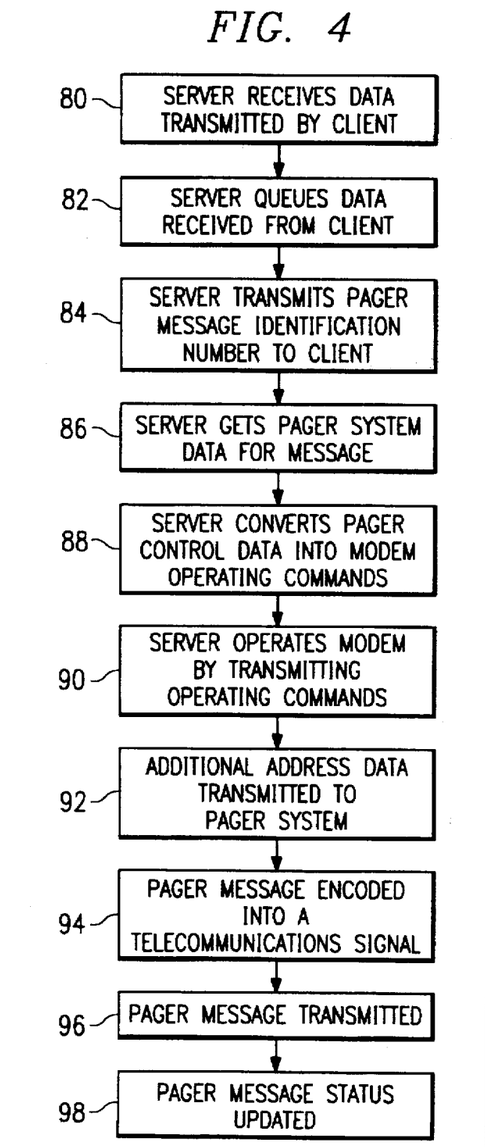
FIG. 4 is a flow chart of the steps performed by the client node and pager server of the present invention to send a page message.

FIG. 4 is a flow chart of the steps performed by client node 14 and primary pager server 40 of the present invention. At step 80, primary pager server 40 receives the pager address data and pager message data transmitted by client node 14 at step 58 of FIG. 2. At step 82, primary pager server 40 queues this pager address data and pager message data by storing this data in message data file 35 on data storage 34. Queuing may be performed by keying off of certain data, for example, pager address data, pager message data, the time that the data was received at the pager server, the time that the data was transmitted by the caller, according to a priority setting chosen by the caller or assigned by the system, or any other data field that comprises, for example, the pager address data or the pager message data.

At step 84, primary pager server 40 transmits a pager message ID number to the caller at client node 14 that uniquely identifies the pager address data and pager message data. The pager message ID numbers are automatically generated by the pager server operating software operating on processor 46 of primary pager server 40, which prevents the generation of duplicate pager message ID numbers. Primary pager server 40 also assigns a status of "pending" to the pager message ID number, and maintains a list of the current status of all pager message ID numbers in pager status file 37 on data storage 34. Primary pager server 40 transmits the pager ID message status in response to a status request from the caller at client node 14.

At step 86, primary pager server 40 retrieves pager system data file 39 stored on data storage 34 for the pager systems specified in the pager address data when the pager address data and pager message data in message data file 35 has progressed through the queue and is ready to be transmitted. The pager server also changes the status of the pager message ID in pager status file 37 from "pending" to "sending." Pager system data file 39 contains the pager system parameters, such as the telephone number, baud rate, transmission protocol, and any other information needed to send the pager message data to the pager system through external communications medium interface device 42.

At step 88, primary pager server 40 converts the pager address data in pager system data file 39 into external communications medium interface device 42 operating instructions. At step 90, primary pager server 40 transmits the operating instructions to the external communications medium interface device 42. External communications medium interface device 42 receives the operating instructions and performs the functions necessary to connect with the external paging system (not explicitly shown) through the external communications medium.

After external communications medium interface device 42 has connected with the pager system, primary pager server 40 transmits at step 92 any additional address information required to transmit the pager message data to the user of the paging system via the paging system. At step 94, primary pager server 40 retrieves the pager message data from message data file 35 and encodes it into a telecommunications signal using the parameters specified in pager system data file 39. The encoded signal is transmitted at step 96. One skilled in the art will recognize that the pager message data may be encoded by primary pager server 40 any time between the receipt of the pager message data by primary pager server 40 at step 80 and the transmission of the data at step 96 without departing from the spirit or scope of the present invention.

At step 98, primary pager server 40 changes the status of the pager message ID in pager status file 37 from "sending" to "sent." If primary pager server 40 is unable to transmit the pager message data, such as if the telephone number dialed is out of service, then primary pager server 40 changes the status of the pager message ID in pager status file 37 to "error." One skilled in the art will recognize that additional pager message ID status states may be defined.

Compatibility with Other Network Services

To optimize network compatibility of the paging system in accordance with the teachings of the present invention, the pager server operating software operating on processor 46 of primary pager server 40 may retrieve address data comprising a list of addresses during initialization at step 50 of FIG. 2 and transmit it to processor 22 at client node 14 at this time. Transmission of address data during initialization may be selected to minimize data transfer over communications medium 12 of computer network 10 where each user at client nodes 14 requires daily use of paging services and where pager addresses do not change frequently.

Alternately, the list of addresses may be transmitted every time the user at client node 14 activates the pager server access software at step 52 of FIG. 2. This method may optimize coordination with other network services where pager services are used infrequently by each individual user, or where the list of pager addresses is updated frequently by the pager server administrator. Other alternatives may be used to increase compatibility with other network services, such as transmitting a general directory once at logon and transmitting a rotating directory when pager services are activated.

Additional address information may also be stored on data storage 16 of client node 14, such as personal pager addresses or pager addresses that are frequently used by the user at client node 14. This increases compatibility with other network services by allowing users to store personal pager address data locally on data storage 16 and saving network storage capacity on data storage 34.

The present invention provides additional network comparability by supporting automatic error notification in network 10. Server operating software operating on processors 32 and 46 and server accessing software operating on processors 22 may include automatic error notification capability that automatically generates and transmits error messages to a predetermined pager address in the event of software or hardware error. Thus, the present invention increases network compatability by providing for immediate administrator notification of hardware or software errors occurring at mail servers, printer servers, client nodes, or other network locations.

Fault Tolerance

Figure 5:
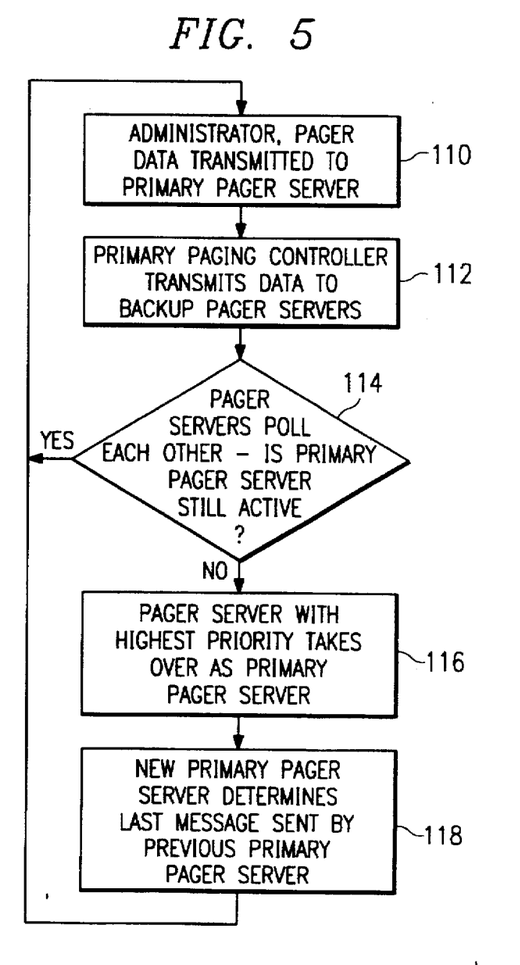
FIG. 5 is a flow chart showing the operation of the primary and backup pager servers of the present invention.

FIG. 5 is a flow chart showing the operation of primary pager server 40 and back-up pager servers 48 of the present invention. Primary pager server 40 and back-up pager servers 48 provide fault tolerance that is a characteristic of network-based services. At step 110, primary pager server 40 receives pager address data and pager message data from client nodes 14, system data from a system administrator, or other types of data required for operation of primary pager server 40.

At step 112, primary pager server 40 transmits data received from the system administrator or client nodes 14 to all back-up pager servers 48. At step 114, primary pager server 40 and back-up pager servers 48 poll each other to determine whether primary pager server 40 is still active. If primary pager server 40 is still active, it will respond to the poll and back-up pager servers 48 will maintain their status and priority.

If primary pager server 40 does not respond to the poll, it is considered to be inactive by back-up pager servers 48. Back-up pager server 48 having the highest priority ranking will begin operating as new primary pager server 40. At step 118, new primary pager server 40 determines the last message transmitted by the previous primary pager server 40, and transmits all remaining messages in the queue.

One skilled in the art will recognize that the steps shown in FIG. 5 may occur in an order that differs from the one shown without departing from the scope or spirit of the present invention. For example, back-up pager servers 48 may monitor data transmitted over communications medium 12 of network 10 and receive pager address data and pager message data directly from communications medium 12, instead of from primary pager server 40. Other data transmission procedures typical of network-based data communications may be used without departing from the spirit or scope of the present invention.

In operation, computer network 10 of FIG. 1 provides pager services to client nodes 14 through primary pager server 40. A caller at one of client nodes 14 is able to enter and address a text page message for a user of a paging system, and need not have an external communications medium interface device or pager system software operating on client node 14. Network 10 may include primary pager server 40 and back-up pager servers 48, and may be functional to transfer operations from primary pager server 40 to one of back-up pager servers 48 to ensure fault tolerance and prevent interruption of service.

Although the present invention has been described in detail, it should be understood that various changes, substitutions, and alterations can be made hereto without departing from the spirit and scope of the invention as defined by the appended claims.

What is claimed is:

1. A method for providing pager services to users of a computer network, comprising the steps of:
   transmitting pager address data and pager message data from a client node on a network to a primary pager server on the network;
   transmitting the pager address data and pager message data from the primary pager server to a back-up pager server;
   polling the primary pager server from the back-up pager server;
   changing the back-up pager server to the primary pager server if the primary pager server does not respond to the poll;
   controlling an external communications medium interface device with the pager address data to interface with a pager system via an external communications medium; and
   transmitting the pager message data from the primary pager server to the pager system over the external communications medium.

2. The method of claim 1 wherein the step of transmitting pager address data and pager message data from a client node further comprises the steps of:
   transmitting a request for a file of pager addresses from the client node to the primary pager server;
   transmitting the file of pager addresses from the primary pager server to the client node;
   selecting individual addresses from the file of pager addresses to create the pager address data;
   entering pager message data at the client node; and
   transmitting the pager address data and pager message data from the client node to the primary pager server.

3. The method of claim 1 wherein the step of controlling an external communications medium interface device further comprises the steps of:
   retrieving from a memory a pager system access number, pager user number, and pager system data transfer parameters corresponding to each individual address in the pager address data;
   setting the data transfer parameters of the external communications medium interface device to match the pager system data transfer parameters;
   transmitting control signals from the primary pager server to the external communications medium interface device to cause the external communications medium interface device to transmit the pager system access number over the external communications medium;
   interfacing with the pager system over the external communications medium; and
   transmitting to the pager system the pager user number corresponding to the individual address in the pager address data.

4. The method of claim 1 wherein the step of transmitting the pager message data from the primary pager server further comprises the steps of:
   retrieving from a memory pager system data communications parameters for the pager system interfaced by the external communications medium interface device; and
   transmitting the pager message data from the primary pager server to the pager system using the pager system data communications parameters.

5. The method of claim 1 further comprising the steps of:
   assigning a priority to each of at least one back-up pager servers;
   transmitting the pager address data and pager message data from the primary pager server to each of the back-up pager servers;
   polling the primary pager server from each of the back-up pager servers; and
   changing the back-up pager server with the highest priority to the primary pager server if the primary pager server does not respond to the poll.

6. The method of claim 1 further comprising the steps of:
   queueing the pager address data and pager message data received at the pager server according to a value in a data field of the pager address data and pager message data;
   assigning a status for each queued pager address data and pager message data; and
   updating the status of each queued pager address data and pager message data when the status changes.

7. The method of claim 1 further comprising the steps of:
   generating at one of a network user or a network server pager address data and pager message data in response to an error message; and
   transmitting the pager address data and pager message data to the primary pager server if the error message does not occur at the primary pager server.

8. The method of claim 1 further comprising the step of storing at one of the primary pager server and the client node a hotlist file that includes the most frequently used pager address data entered by a user.

9. The method of claim 2 wherein the step of transmitting the file of pager addresses further comprises the steps of:
   retrieving at the primary pager server a hotlist file of the most frequently used addresses selected by a user at the client node; and
   transmitting the hotlist file from the primary pager server to the client node.

10. A method for providing pager services to users of a computer network, comprising the steps of:
    transmitting a request for a file of pager addresses from a client node to a primary pager server;
    transmitting the file of pager addresses from the primary pager server to the client node;
    selecting addresses from the file of pager addresses at the client node to create pager address data;
    entering pager message data at the client node;
    transmitting the pager address data and the pager message data from the client node to the primary pager server;
    transmitting the pager address data and pager message data from the primary pager server to a back-up pager server;
    polling the primary pager server from the back-up pager server;
    changing the back-up pager server to the primary pager server if the primary pager server does not respond to the poll; and transmitting the pager message data to a pager system.

11. The method of claim 10 wherein the step of transmitting the pager message further comprises the steps of:
    determining a pager system access number, pager user number, and pager system data transfer parameters corresponding to each individual address in the pager address data;

setting the data transfer parameters of an external communications medium interface device to match the pager system data transfer parameters;

transmitting control signals from the primary pager server to the external communications medium interface device to cause the external communications medium interface device to transmit the pager system access number and pager user number corresponding to each individual address in the pager address data over the external communications medium;

determining pager system data communications parameters for the pager system interfaced by the external communications medium interface device; and transmitting the pager message data from the primary pager server to the pager system using the pager system data communications parameters.

12. The method of claim 10 further comprising the steps of:

assigning a priority to each of at least one back-up pager servers;

transmitting the pager address data and pager message data from the primary pager server to each of the back-up pager servers;

polling the primary pager server from each of the back-up pager servers; and changing the back-up pager server with the highest priority to the primary pager server if the primary pager server does not respond to the poll.

13. The method of claim 10 further comprising the steps of:

queuing the pager address data and pager message data received at the pager server according to a data field in the pager address data and pager message data;

assigning a status for each queued pager address data and pager message data; and updating the status of each queued pager address data and pager message data when the status changes.

14. The method of claim 10 wherein the step of transmitting pager address data and pager message data from a client node comprises the steps of:

generating at one of a network user or a network server pager address data and pager message data in response to an error message; and transmitting the pager address data and pager message data to the primary pager server if the error message does not occur at the primary pager server.

15. The method of claim 10 further comprising the step of storing at the pager server a hotlist file for a user of the client node that includes the most frequently used pager address data entered by each user.

16. A computer network with pager services, comprising:

a communications medium;

an external communications medium interface device coupled to the communications medium;

a client node coupled to the communications medium, the client node operable to transmit pager address data and pager message data to the communications medium;

a server coupled to the communications medium, the server operable to receive the pager address data and pager message data from the communications medium, the server further operable to determine a pager system access number and user number from the control data, the server further operable to transmit the pager system access number, user number, and pager message data to the external communications medium interface device;

at least one back-up server operable to poll the server, the back-up server further operable to change its status from the back-up pager server to server if a poll to the server is not returned;

wherein the server is operable to transmit all pager address data and pager message data to each back-up server; and wherein the external communications medium interface device is operable to receive the pager system access number, user number, and pager message data from the server over the communications medium, transmit the pager system access number over an external communications medium, and transmit the user number and pager message data to the pager system over the external communications medium.

17. The computer network of claim 16 wherein the external communications medium interface device is coupled to the server and is operable to receive the pager system access number, user number, and pager message data directly from the server.

18. The computer network of claim 16 further comprising:

a data memory coupled to the client node; and wherein a file of frequently used pager addresses and personal pager addresses is stored on the data memory.

19. The computer network of claim 16, wherein an operating system of one of the client node and the server generates pager address data and pager message data in response to an error message generated by the operating system.

20. A method for providing pager services to users of a computer network, comprising the steps of:

transmitting pager address data and pager message data from a client node on a network to a primary pager server on the network;

controlling an external communications medium interface device with the pager address data to interface with a pager system via an external communications medium;

transmitting the pager message data from the primary pager server to the pager system over the external communications medium;

generating at one of a network user or a network server pager address data and pager message data in response to an error message; and transmitting the pager address data and pager message data to the primary pager server if the error message does not occur at the primary pager server.

21. A method for providing pager services to users of a computer network, comprising the steps of:

transmitting a request for a file of pager addresses from a client node to a primary pager server;

transmitting the file of pager addresses from the primary pager server to the client node;

selecting addresses from the file of pager addresses at the client node to create pager address data;

entering pager message data at the client node;

transmitting the pager address data and the pager message data from the client node to the primary pager server, comprising the steps of generating at one of a network user or a network server pager address data and pager message data in response to an error message and transmitting the pager address data and pager message data to the primary pager server if the error message does not occur at the primary pager server; and transmitting the pager message data to a pager system.

22. A computer network with pager services, comprising:

a communications medium;

an external communications medium interface device coupled to the communications medium;

a client node coupled to the communications medium, the client node operable to transmit pager address data and pager message data to the communications medium;

a server coupled to the communications medium, the server operable to receive the pager address data and pager message data from the communications medium, the server further operable to determine a pager system access number and user number from the control data, the server further operable to transmit the pager system access number, user number, and pager message data to the external communications medium interface device;

wherein the external communications medium interface device is operable to receive the pager system access number, user number, and pager message data from the server over the communications medium, transmit the pager system access number over an external communications medium, and transmit the user number and pager message data to the pager system over the external communications medium; and wherein an operating system of one of the client node and the server generates pager address data and pager message data in response to an error message generated by the operating system.

* * * * *